(12) United States Patent
Maddox et al.

(10) Patent No.: US 6,360,414 B1
(45) Date of Patent: Mar. 26, 2002

(54) ROTARY DEFLASHING APPARATUS

(75) Inventors: A. Dale Maddox, Tecumseh; Fred A. Loesch, Britton, both of MI (US)

(73) Assignee: Uniloy Milacron Inc., Manchester, MI (US)

( * ) Notice: Subject to any disclaimer, the term of this patent is extended or adjusted under 35 U.S.C. 154(b) by 0 days.

(21) Appl. No.: 09/578,811

(22) Filed: May 24, 2000

(51) Int. Cl.$^7$ .............................. B23P 21/00; B23B 3/04; B29D 45/00
(52) U.S. Cl. ........................... 29/33 A; 29/33 J; 83/914; 225/23; 425/527; 425/806
(58) Field of Search .................. 29/33 A, 33 J; 225/103, 23; 409/297; 198/409; 83/914, 346, 419, 418, 409, 409.1, 412, 513; 425/527, 806

(56) References Cited

U.S. PATENT DOCUMENTS

| | | | | |
|---|---|---|---|---|
| 3,675,521 A | * | 7/1972 | Ziegler | ..................... 82/101 |
| 3,695,109 A | | 10/1972 | Uhlig | |
| 3,771,394 A | | 11/1973 | Mohney | |
| 3,830,360 A | * | 8/1974 | Graff et al. | ................. 198/409 |
| 3,933,091 A | * | 1/1976 | Von Saspe | ................. 425/806 |
| 3,994,651 A | | 11/1976 | Kamibayashi | |
| 4,272,233 A | * | 6/1981 | Cochran | ..................... 425/526 |
| 4,614,018 A | * | 9/1986 | Krall | ............................ 29/33 J |
| 4,834,643 A | | 5/1989 | Klinedinst et al. | |
| 4,886,443 A | | 12/1989 | Klinedinst et al. | |
| 4,982,635 A | | 1/1991 | Thatcher | |
| 5,118,276 A | | 6/1992 | Hashimoto | |
| 5,202,135 A | * | 4/1993 | Yawn | ..................... 425/806 X |
| 5,292,241 A | | 3/1994 | Fang et al. | |
| 5,431,865 A | * | 7/1995 | Quin | ..................... 425/806 X |
| 5,470,220 A | | 11/1995 | Potes et al. | |
| 5,901,270 A | * | 5/1999 | Quin | ..................... 425/806 X |
| 6,136,254 A | * | 10/2000 | Weber | ........................ 425/540 |

FOREIGN PATENT DOCUMENTS

JP 154851 * 6/1993 ................. 29/33 A

* cited by examiner

Primary Examiner—William Briggs
(74) Attorney, Agent, or Firm—Brinks Hofer Gilson & Lione (57) ABSTRACT

An apparatus for deflashing plastic blow molded articles is disclosed. The apparatus includes feed screw which engage one side of the container to move the container. A nesting wheel and a trim wheel are rotated in opposite directions to bring trim tools and nest tools together. The screw moves the container so that the nest tool engages the container and carries the container so that it is between the nest tool and trim tool as they intermesh. As a result, the container is nested, trimmed and released in one continuous motion.

28 Claims, 15 Drawing Sheets

ROTARY DEFLASHING APPARATUS

BACKGROUND OF THE INVENTION

The invention relates to blow molding machinery and more particularly to an apparatus for automatically removing flash from extrusion blow molded, plastic objects.

During the extrusion blow molding process, flash is often formed along a portion of the parting line of the molded object. For example, the bottom or base of the container may have a "tail" which is the result of clamping the plastic extruded between the two mold halves. There is also generally unwanted plastic flash attached to the top of the container adjacent to where the threads of the container are formed. If the container has a handle, the section between the handle and the container also contains a web of plastic material corresponding in thickness to two layers of the original parison.

Although there have been a number of different approaches taken to solve the problem of removing flash from extrusion blow molded plastic containers, each of the prior art approaches is complicated and costly. Also, if these prior art devices are not properly operated, the deflasher apparatus can damage the container and render it unacceptable.

These deflashing operations must be performed rapidly and reliably and the apparatus performing the operation must be compact and capable of handling containers at a rate equal to the rate at which the extrusion blow molding machine produces the containers. Also, transfer and trimming of the containers requires that the bottles be accurately oriented prior to deflashing to permit trimming without damage to the container sidewall or bottom. The deflashing apparatus must be compact to minimize factory floor space. None of the known prior art devices are able to meet all of the above requirements.

Therefore, there is a need for a compact apparatus that is preferably in-line with the blow molding machine so as to minimize floor space, and one that is capable of deflashing containers in one continuous motion at a rate equal to the rate at which the blow molding machine produces the containers.

SUMMARY OF THE INVENTION

The present invention is a novel rotary deflashing apparatus for plastic, blow molded articles. The deflashing apparatus is a dual rotary trimmer having two balanced, continuously counter-rotating wheels, namely a nest tool wheel and an intermeshing trim tool wheel. A screw advances the articles sequentially into engagement with the trimmer whereby the articles are deflashed of the tail, body, and the top flash when the nest tool is in juxtaposed position with the trim tool.

It is an object of the present invention to provide a trimmer that is simpler than prior art devices and is capable of deflashing articles of top flash, body flash, and tail flash at a rate equal to the rate at which the blow molding machine produces the articles.

It is another object of the present invention to provide a trimmer that is compact in size and continuous in operation to maximize throughput.

A still further object of the present invention is to provide a trimmer that picks up the article, removes all of the flash from the article and releases the deflashed article in one continuous motion.

These and other objects of the present invention will become apparent to one skilled in the art upon reading the following specification and by reference to the drawings.

DETAILED DESCRIPTION OF THE PREFERRED EMBODIMENT

As used herein, an article or container A is an extrusion blow molded, plastic, article such as, but not limited to, milk containers, bottles, toys, storage tanks, decorative trim objects, prescription bottles and other objects.

Figure 1:
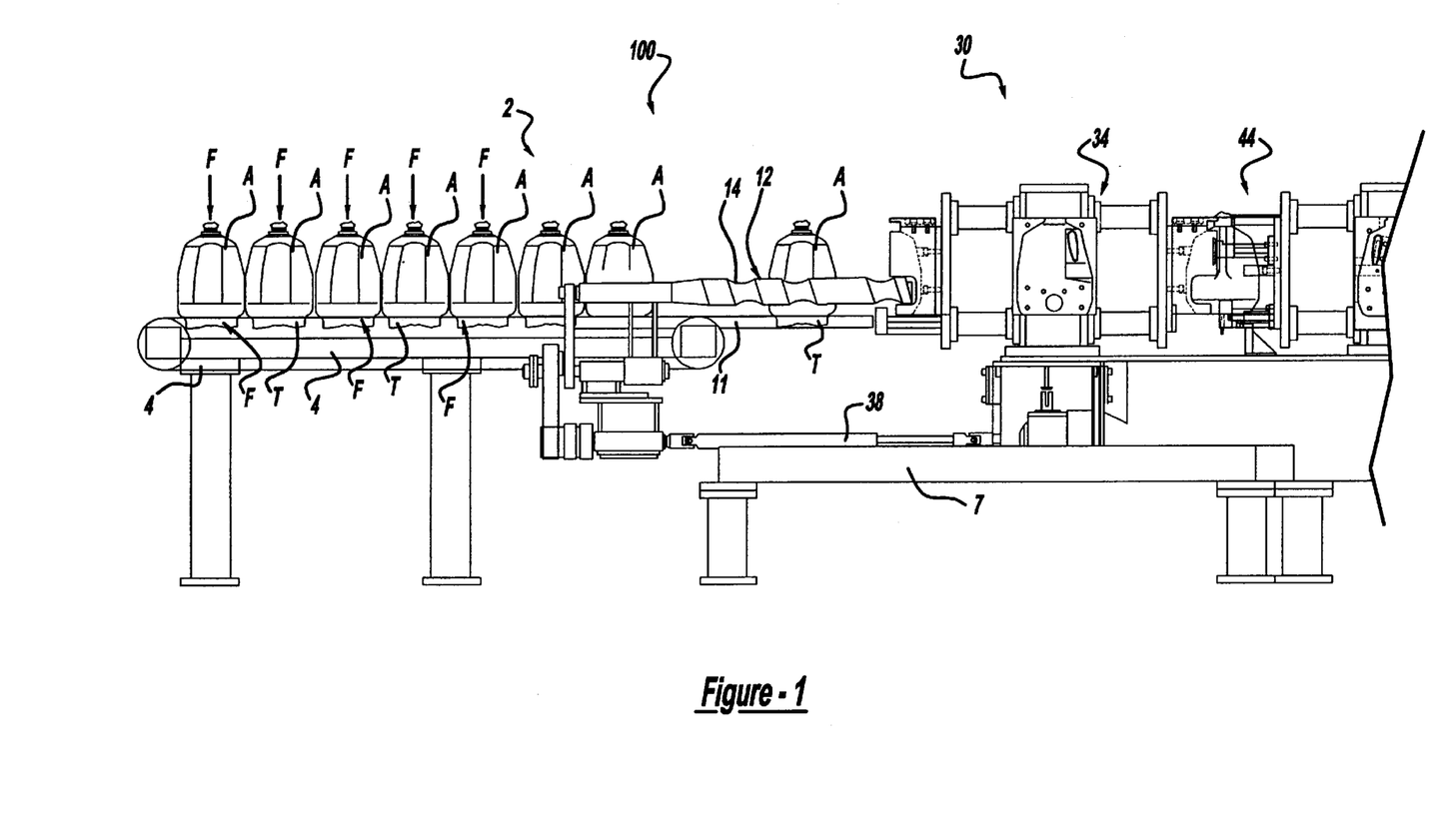
FIG. 1 is a side view of the deflashing apparatus according to the invention.
Figure 2:
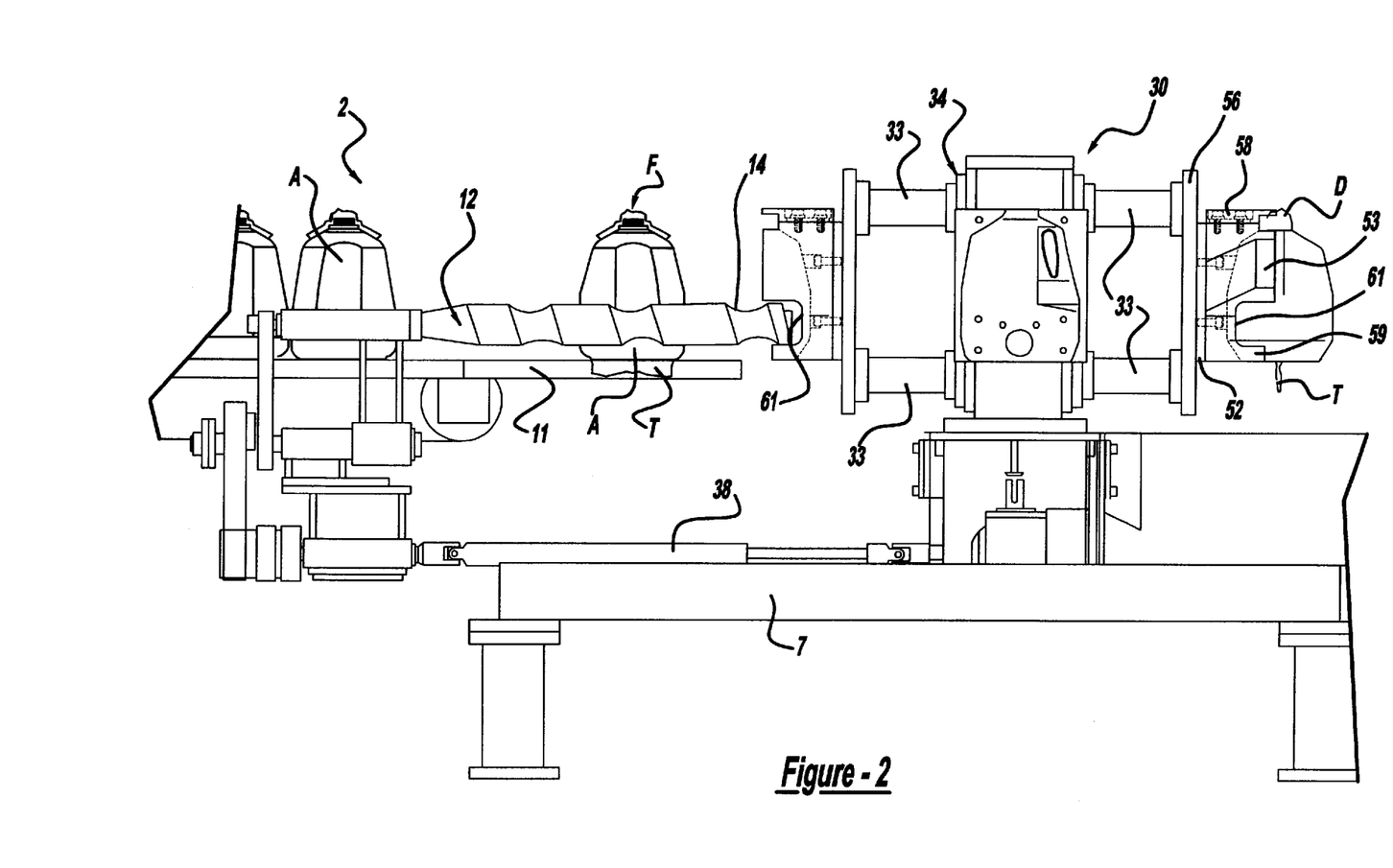
FIG. 2 is an enlarged side view of the deflashing apparatus according to the invention.

The present apparatus 100, as seen in FIG. 1, includes an infeeder 2 and a rotary trimmer 30 for deflashing blow molded containers A (having flash designated at F). The flash F of the container may include the body flash, top flash, and tail flash. The tail flash (further designated as T) is a thin plastic section at the parting line of the mold halves which is the excess remains of the extruded parison during the molding process. Optionally, the container A may also have handle flash depending on the design of the container A.

The infeeder 2 moves the containers A longitudinally and in an upright manner from the molding machine (not shown) on a split conveyor 4. To orient the container A onto the split conveyor 4, the container A is discharged from the molding machine so that the tail flash T extends between the parallel, spaced apart tracks of the split conveyor 4 so that the tail flash T of the container A prevents it from turning or twisting out of orientation.

From the conveyor 4, the containers A are transferred onto a support plate 11 and are picked up or engaged by counter-rotating feed screws 12. The screws 12 have flights or threads 14 which are sized to capture the container A therebetween. The pitch of the screw threads 14 are designed to capture, space and move the container A from the split conveyor 4 into engagement with the rotary trimmer 30. The pitch is preferably variable, increasing along the length of the screws 12, to accelerate and spread out the containers A before they enter the trimmer 30. The height of the support plate 11 is at the same height above the frame as the surface of the split conveyor 4 so that the container A moves in the same longitudinal plane from the conveyor 4 to the support plate 11. At the ends of each screw are the side rails 19 which guide the side of the container A and prevent the container A from moving transversely out of its desired orientation.

Figure 3:
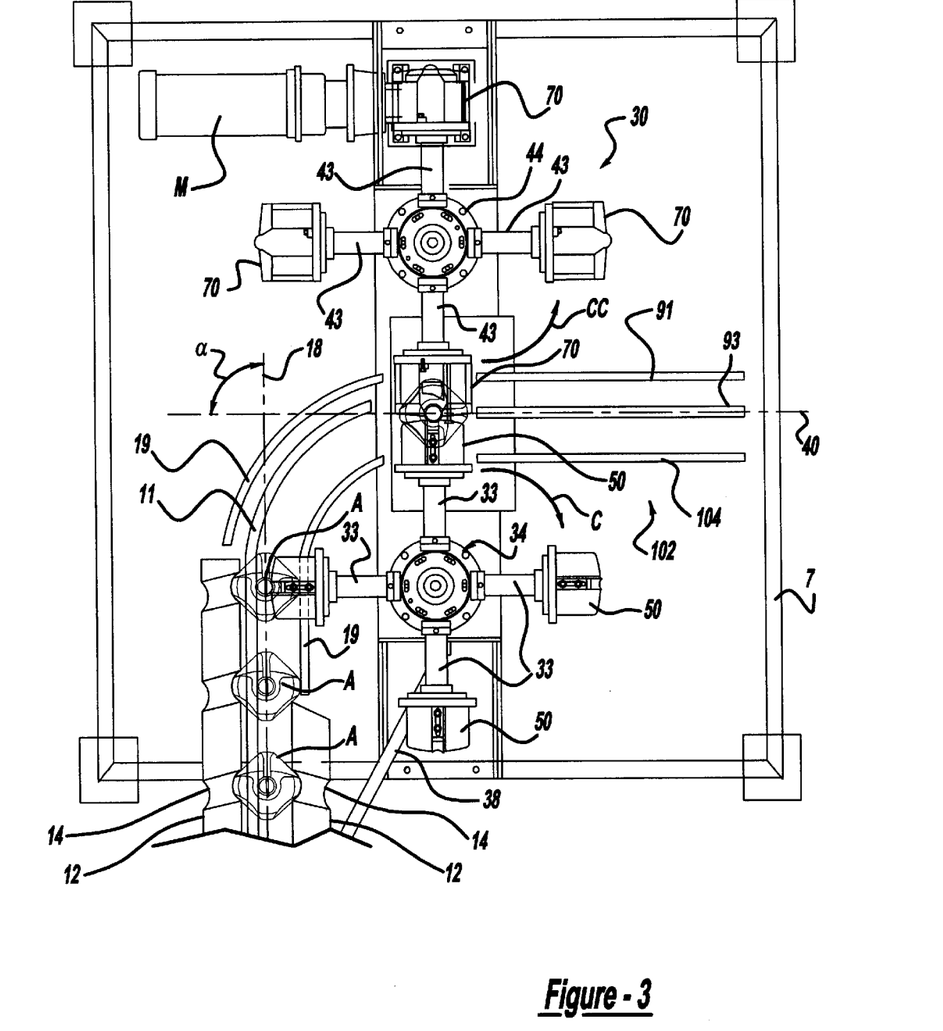
FIG. 3 is a top view of the apparatus with articles being advanced into engagement with the nest tool at approximately 90 degrees to the through line between the two wheels.
Figure 4:
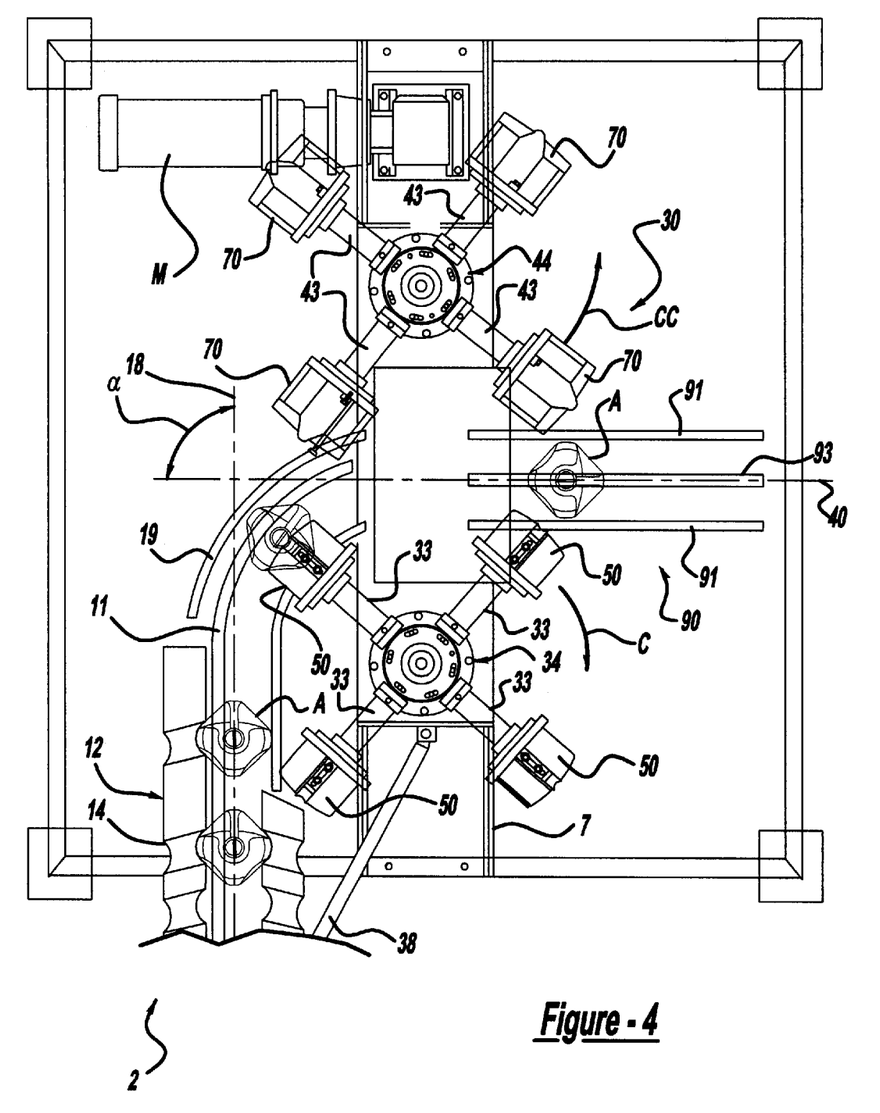
FIG. 4 is a top view similar to FIG. 3 with the wheels of the apparatus having been advanced through about 45 degrees of rotation.

The container A is moved by screws 12 along a longitudinal axis 18 which defines an angle $\alpha$, which can be varied relative to the through line axis 40, as shown in FIGS. 3 through 6. The axis 40 is defined as the longitudinal extension of the meshing tangent point of the two wheels 34 and 44 of the rotary trimmer 30. In its most preferred embodiment, the angle $\alpha$ is 90 degrees relative to the through line axis 40, as shown in FIGS. 3 and 4.

Figure 5:
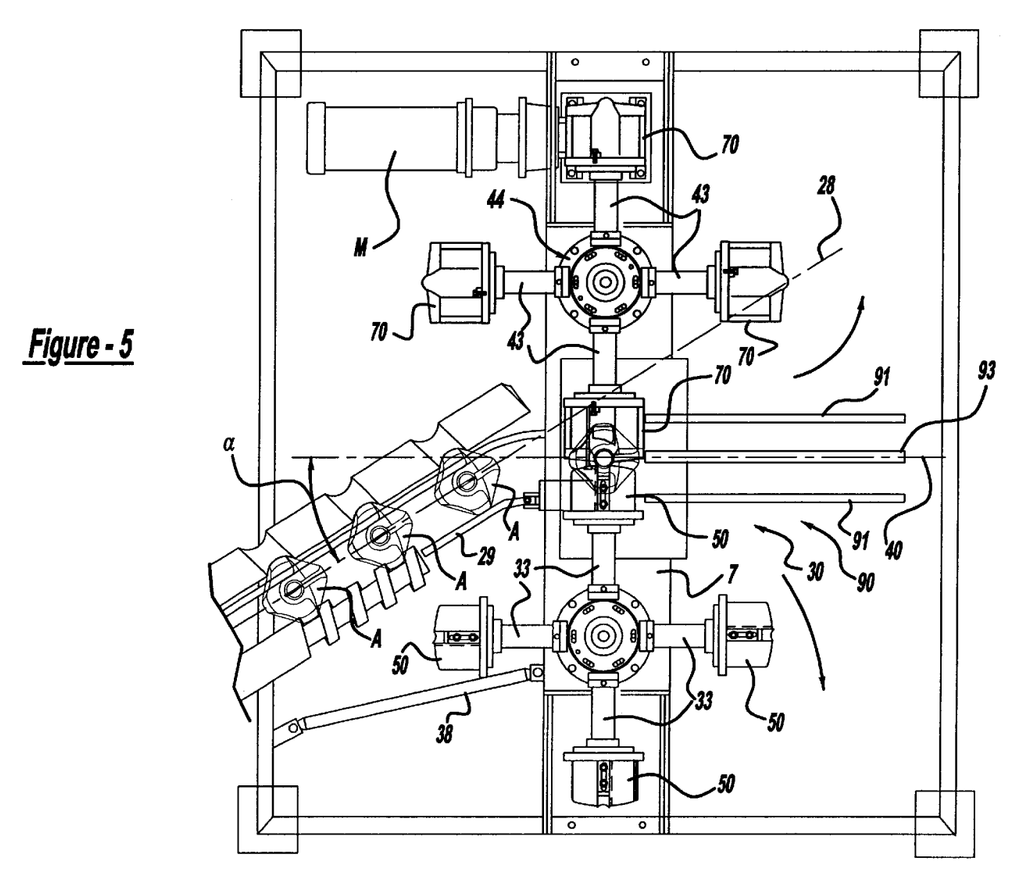
FIG. 5 is a top view of a second embodiment of the apparatus with the articles being advanced into engagement with the nest tool at approximately 30 degrees to the through line between the two.
Figure 6:
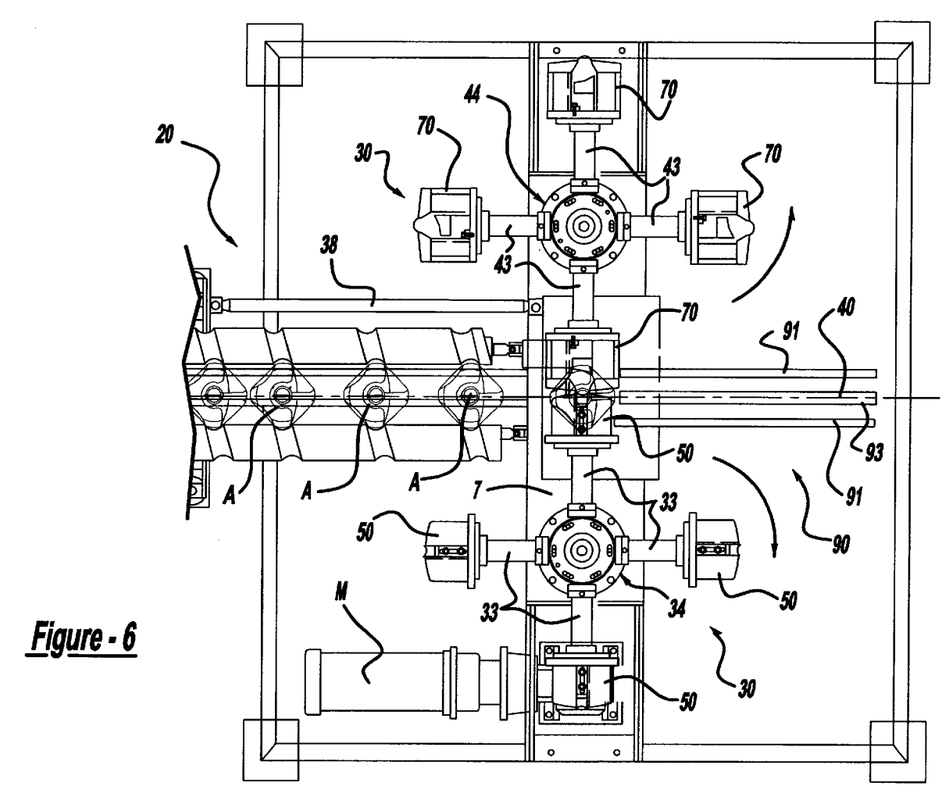
FIG. 6 is a top view of a third embodiment where the articles are being advanced into engagement with both the nest tool and trim tool at 0 degrees or in-line with the through line between the two wheels.

The infeeder's screws 12, as seen in FIGS. 3–5, may have different lengths in order to permit the rotary trimmer 30 to rotate and engage the containers A. This is particularly the case when axis 18 is not aligned with axis 40. In the aligned configuration of FIG. 6, each of the screws 12 may have the same length provided the diameter of the screws 12 is such that they permit the rotary trimmer 30 to rotate into and engage the containers A without interference.

The trimmer 30 includes a pair of counter-rotating wheels 34, 44 supported on a frame 7. The first of counter-rotating wheels, wheel 34, carries a series of nest tools 50 and the second wheel, trim wheel 44, carries a series of trim tools 70.

The nest wheel 34 and the trim wheel 44 are supported on vertical shafts each having a drive wheel on its lower end supported by conventional bearings. The drive wheels of the nest and trim wheels 34, 44 are driven by one or more drive belts, chains or gears, so that they are counter-rotating and synchronized in relation to one another. The vertical shafts, drive wheels and belts are not illustrated in the figures for the sake of clarity with respect to the other elements illustrated therein. Such illustration is not believed necessary since persons skilled in the art will readily appreciate a variety of possible drive trains and schemes after having the benefit of this disclosure.

The nest wheel 34 and the trim wheel 44 each are provided with the same number of equidistantly spaced pairs of arms 33, 43 extending radially therefrom. The number of arm pairs 33, 43 will depend on the rate at which containers A are to be deflashed and will preferably be between two and forty-eight, although this range is given only by way of example and is not to be considered a limitation on the number of arm pairs 33, 43, or individual arms that can be used to practice the invention. Preferably, there are four arm pairs 33, 43 on each of the wheels 34, 44.

Figure 7:
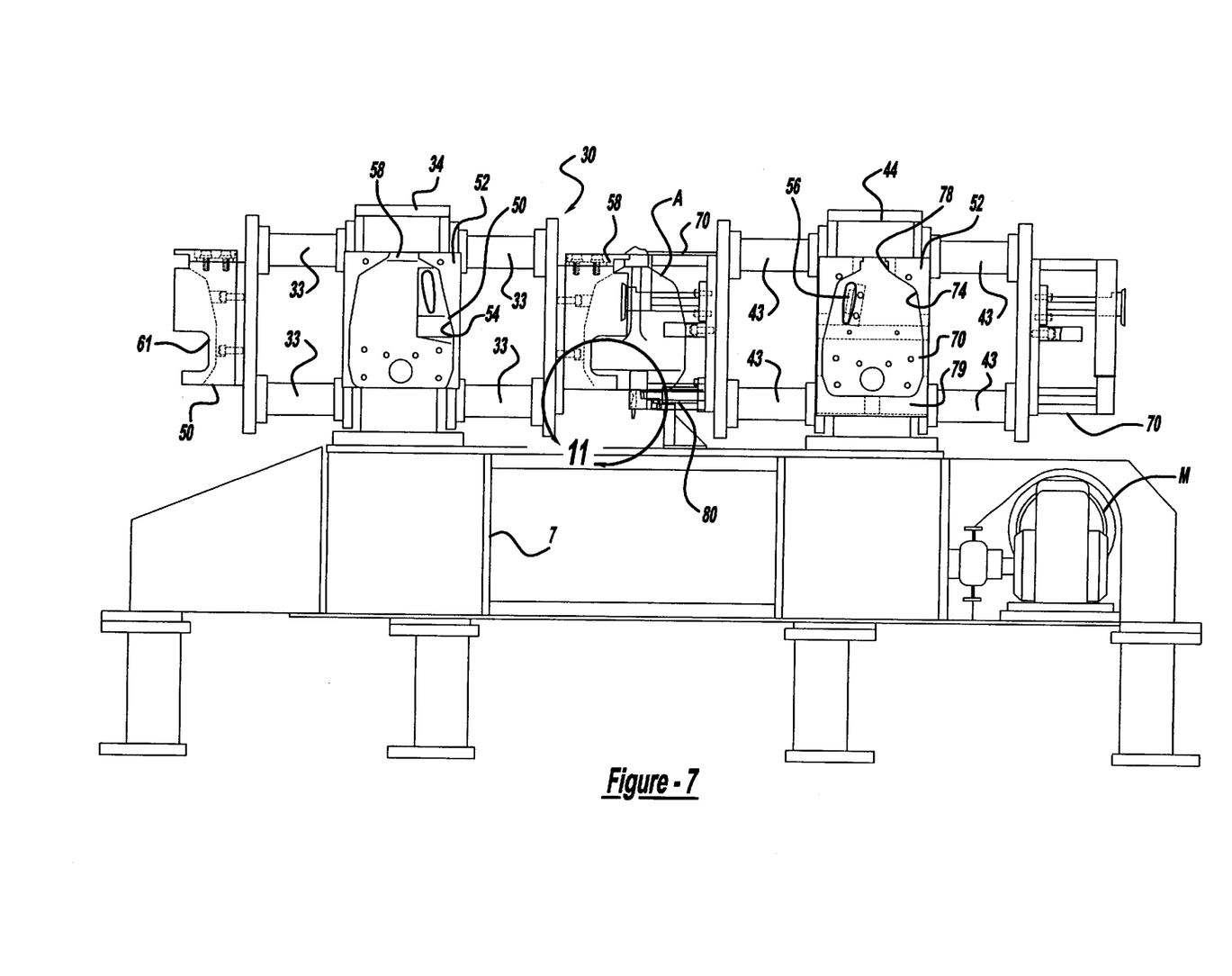
FIG. 7 is an enlarged view of the apparatus showing the nest tool on the second wheel and trim tool on the first wheel.
Figure 8:
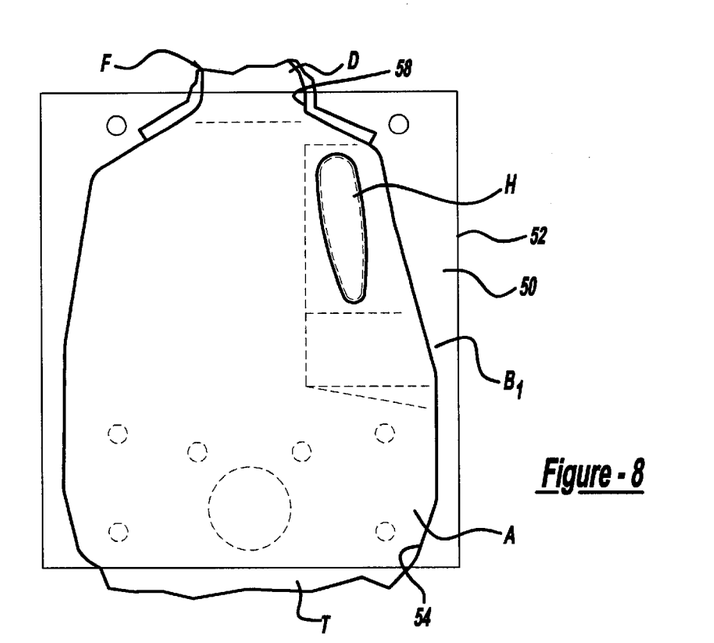
FIG. 8 is a side elevational view of an article (with top, body, tail and handle flash) held in the nest tool prior to deflashing.
Figure 9A:
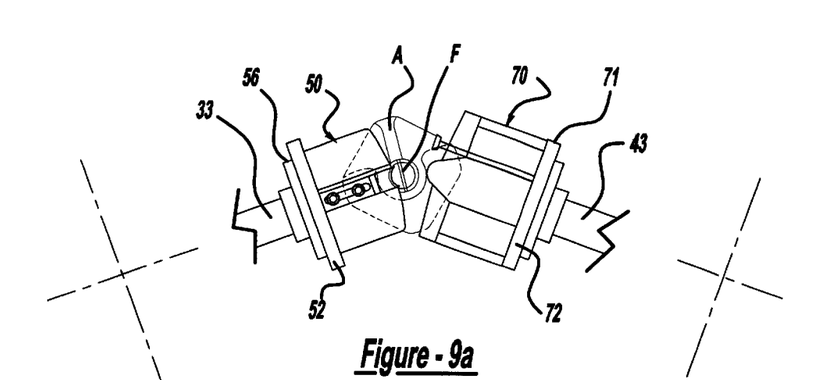
FIG. 9a is a top view of the nest tool with an article being rotated and with the trim tool engaging the leading edge.
Figure 9B:
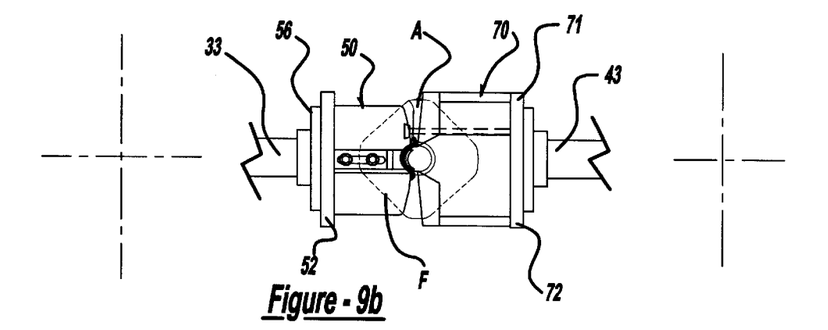
FIG. 9b is a top view of the article partially deflashed and held between the nest tool and trim tool.
Figure 10:
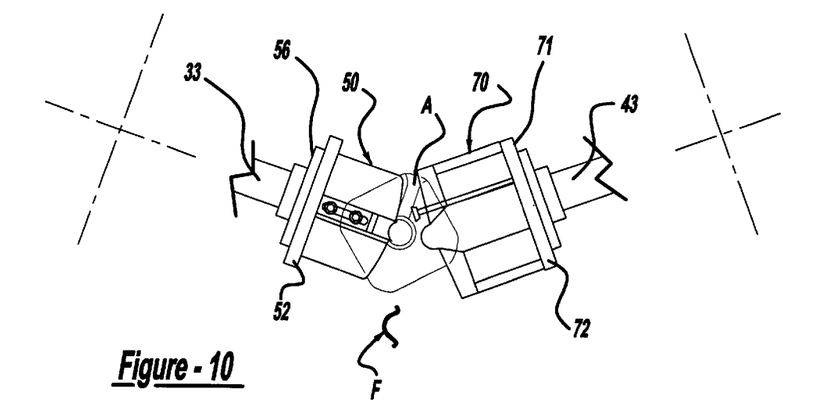
FIG. 10 is a top view of the article partially deflashed and held between the nest tool and the trim tool and beginning to deflash the trailing edge of the article.
Figure 11:
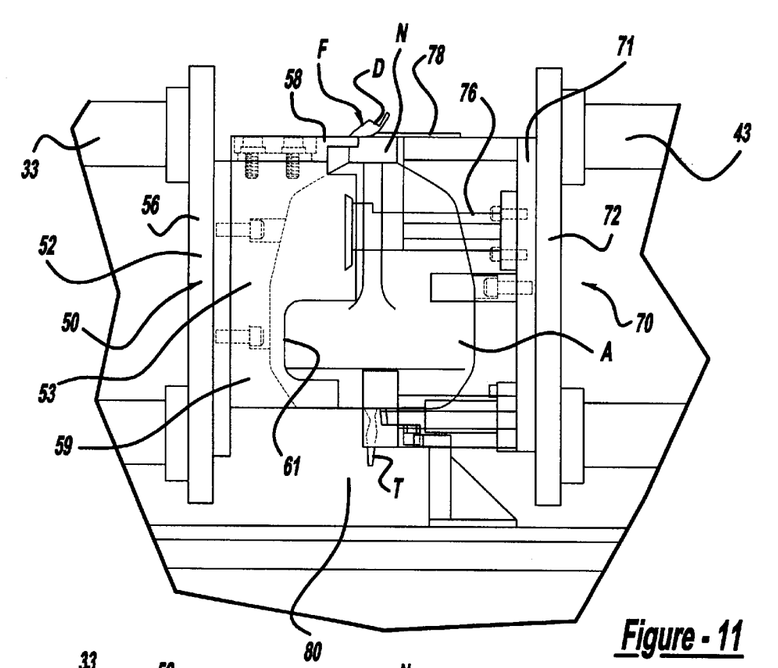
FIG. 11 is a side view of the article seen in FIG. 9b with tail and top flash partially removed.
Figure 12:
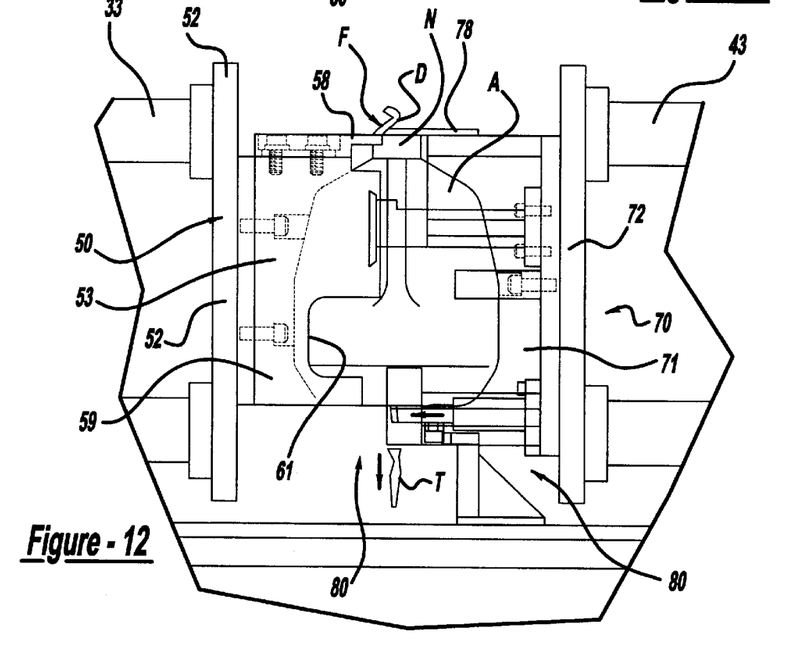
FIG. 12 is a side view similar to FIG. 11 with the tail flash removed and the top flash nearly completely removed.
Figure 13:
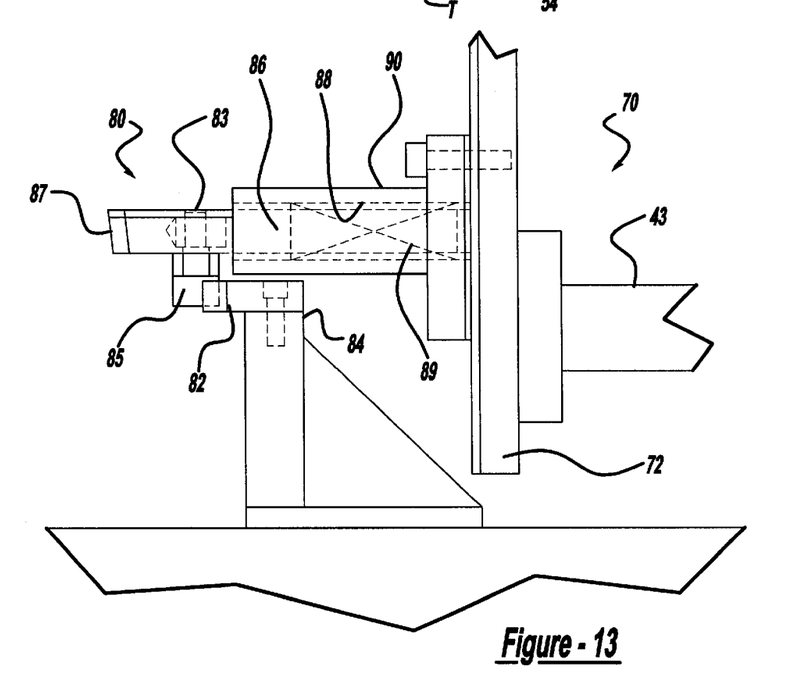
FIG. 13 is a side view of the tail flash trimmer.
Figure 14:
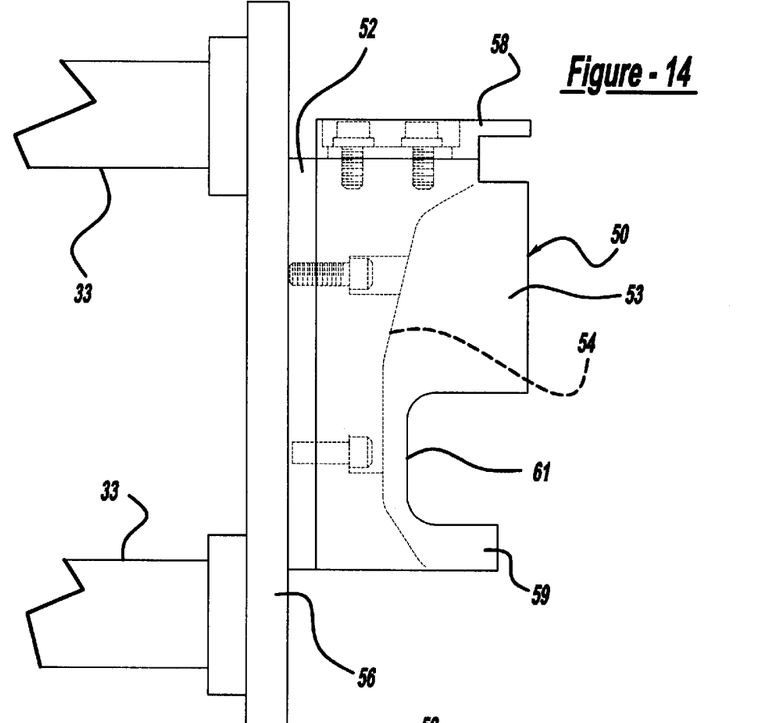
FIG. 14 is a side view of the nest tool.
Figure 15:
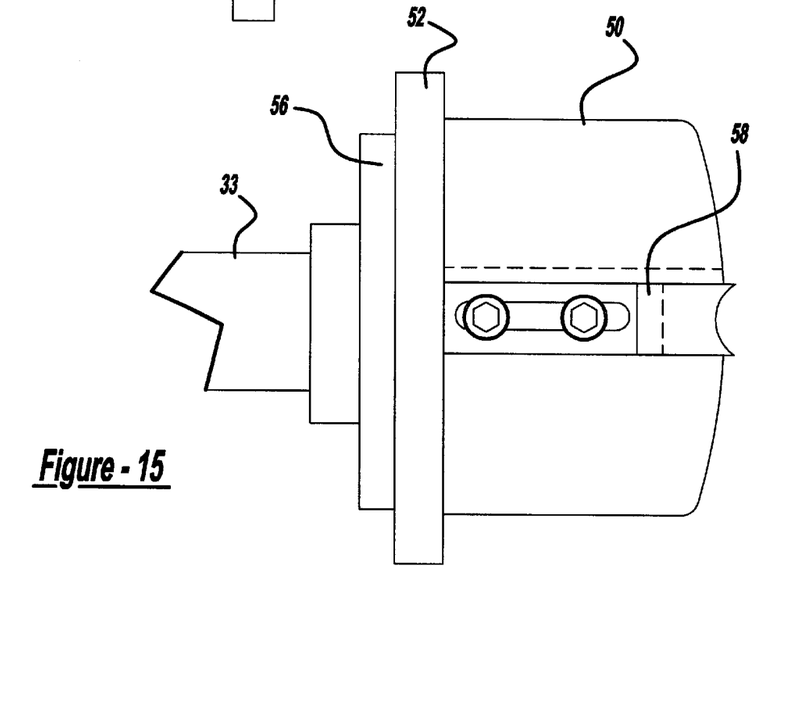
FIG. 15 is a top view of the nest tool.

As shown in FIGS. 14 and 15, a nest tool 50 is mounted to a support plate 56 connected by conventional fasteners to the ends of the arm pairs. The nest tool 50 itself includes a mounting plate 52 which enables securement to the plate 56 on the arm pairs 34, 44. The nest tool 50 is segmented and includes a body portion 53 defining a cavity 54, a top support portion 58 located above the body portion 53 and a bottom portion 59 which is located above the cavity 54. Depending on the container A, the cavity 54 may also define a handle portion. As such, a container A with flash F fits into and is closely held by the body cavity 54 preventing it from being dislodged out of the cavity 54. The neck N of the container A rests against or within the support portion 58 and the tail flash T extends below the bottom portion 59 as shown in FIGS. 7, 11 and 12. For a container A with a handle and flash H, these portions fit into the optional handle portion of the nest tool 50. The body portion 53 and bottom portion 59 cooperate to define a recess 61, as seen in FIGS. 2, 7, 11, 12 and 14. The recess 61 provides clearance to enable the trim tool 50 to swing by the inboard screw 12 without interference.

Figure 16:
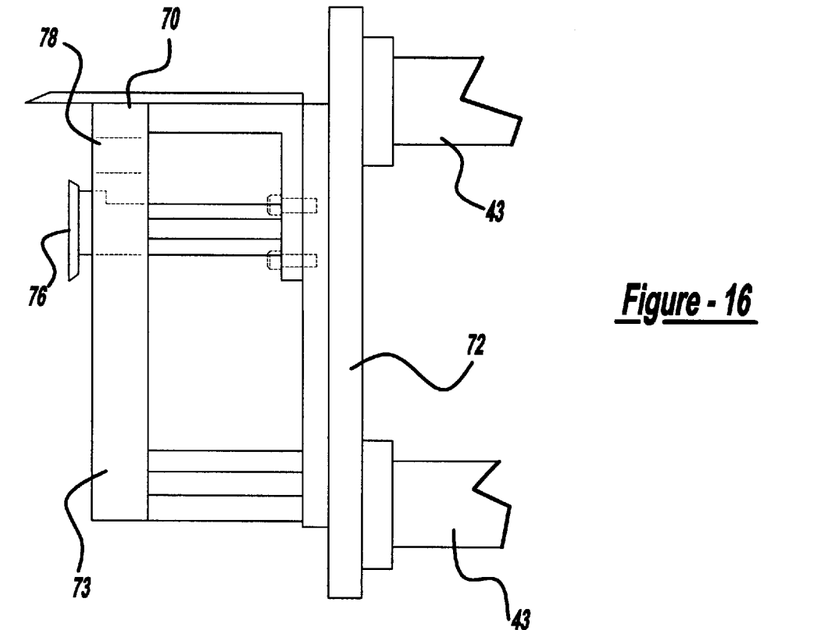
FIG. 16 is a side view of the trim tool.
Figure 17:
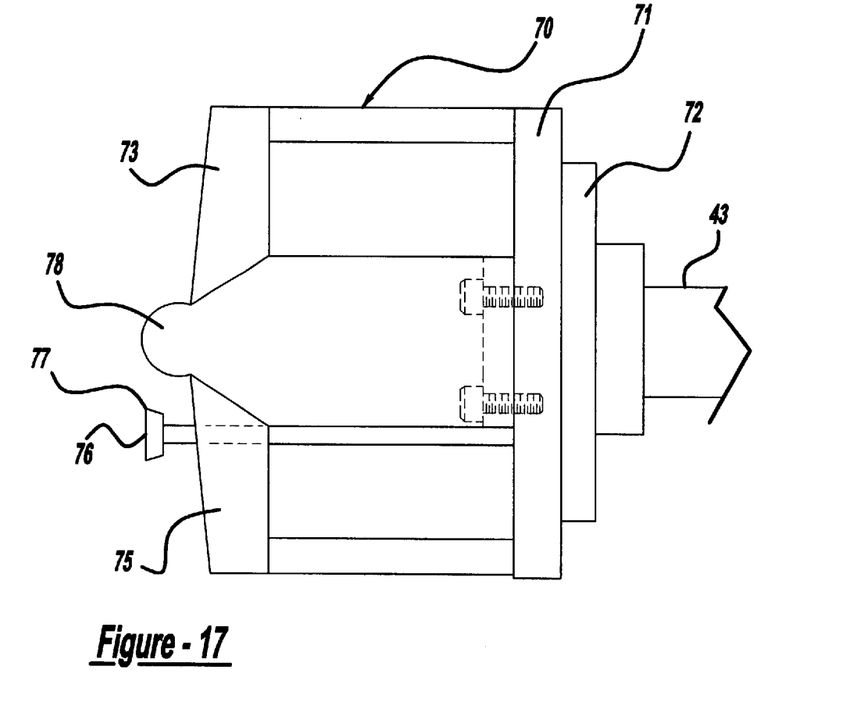
FIG. 17 is a top view of the trim tool.

The trim tool 70 is mounted to a vertical support plate 72 secured to the ends of the arm pairs 43 by conventional fasteners. This is shown in FIGS. 16 and 17. The trim tool 70 has a mounting plate 71 which secures it to the plate 72 mounted on the ends of the arm pairs 43. The trim tool 70 includes a top trim knife 78, a handle trim knife 56 and a tail trimmer assembly 80.

As stated earlier, the container A is captured in the nest tool 50 so that the flash F extends above and below the tool 50. As the nest tool 50 and the trim tool 70 rotate into juxtaposed engagement with each other, the top trim knife 78, having an arcuate edge, cuts off top flash D which extends beyond the top portion 58 in a manner which prevents the neck N of the container A from moving. The cutting edge of the top trim knife 78 shears off the flash D from the container A nested in the nest tool 50 as the nest tool 50 and trim tool 70 rotate past and intermesh with each other. As the cutting edge of the knife 78 swings through its arc of motion, it shears and/or pushes the flash D radially from the parting line on the container A toward the nest tool 50 as the nest tool 50 on the first wheel 34, and the trim tool 70 on the second wheel 44, are rotated into and meet each other at the plane along axis 40. Those skilled in the art will recognize that because the extruded blow molded flash plastic material is brittle, the flash F, in general, may be pressed off and/or cut off by the trim tool 70 and pushed toward the nest tool 50. Optionally, the nest tool 50 is provided with biasing means (not shown) to push the trimmed flash away from the nest tool 50 after the nest tool 50 and trim tool 70 have rotated past one another and are no longer in juxtaposed position. In achieving the above, it is noted that the knife 78 extends from the trim tool 70 a distance such that its cutting edge is beyond the part line on the container A, where the flash is still attached thereto.

In a like manner, any additional flash F along the top of the container shoulder may be sheared off at the container by leading and trailing cutting edges 75, 73, located immediately below the top trim knife 78.

Handle flash H is trimmed by the handle trim knife 76. The handle trim knife 76 is sized to be received within the handle opening formed in the container A and at least its cutting edges 77 protrude beyond the parting line of the container A thereby insuring that the handle flash H is severed away from the handle.

The tail trimmer assembly 80 is seen in FIGS. 7, 11, 12 and 13. For clarity, the assembly has been omitted from FIGS. 16 and 20. The assembly is cam actuated and includes a fixed portion mounted to the frame 7, and a rotated portion, identical assemblies of which are carried by each trim tool 70.

The fixed portion includes a cam 82 mounted to a bracket 84 that secures the cam 82 to the frame 7 in a fixed position. The cam 82 includes a cam surface defining a radial face with respect to the rotational axis of the trim wheel 44.

The second or rotated portion of the tail trimmer assembly 80 includes a blade 83 which is moveably supported with respect to the remainder of the trim tool 70. Blade 83 is supported on pins 86 located within bores 88 of mounting blocks 90 that are themselves secured to the actual trim tool 70. Blade 83 is biased by springs or other suitable means 89 such that the biasing retracts the blade 83 towards the axis of rotation of the trim wheel 43. Extending downward from the blade 83 is a follower 85.

As the trim tools are rotated by the trim wheel 43, the follower 85 is brought into engagement with the cam surface 87 of the cam 82. Continued rotation of the trim tool 70 results in the follower 85 progressing radially outward along the cam surface 87 against the biasing of the springs. This radial outward movement of the follower 85 results in the blade 83 being radially moved outward as well. Outward movement of the blade brings the cutting edge 89 of the blade into engagement with the tail flash T as the tool 70 is rotating into juxtaposed position with the nest tool 50. When the follower 85 clears the cam 82, the blade 83 is retracted radially back toward the remainder of the trim tool 70 by the biasing member 89.

Figure 19:
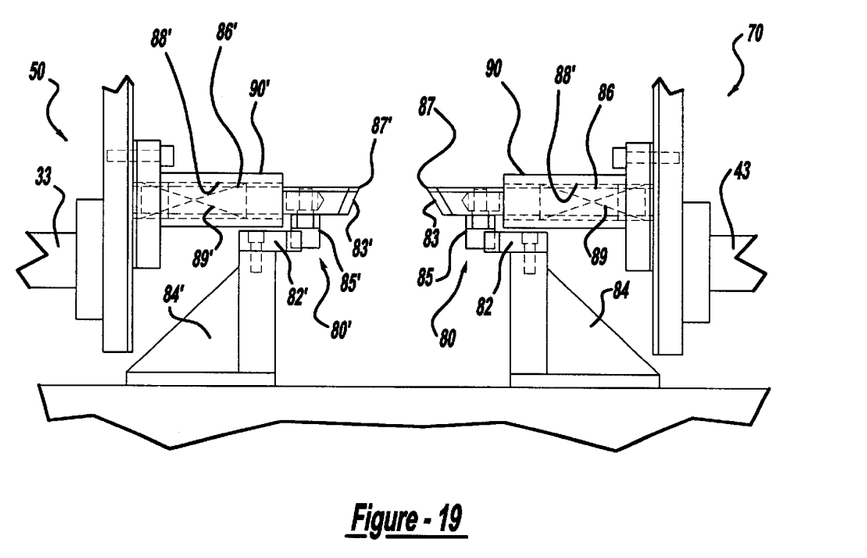
FIG. 19 is a side view of an embodiment of a dual tail flash trimmer.

Optionally, the tail trimmer apparatus 80 may include a second tail trimmer apparatus 80', similar to apparatus 80 but located in association with the nest tool 50. The second tail trimmer tool 80' is identical in all respects to apparatus 80 and those elements used in apparatus 80' that are the same are provided with a prime (') designation. Thus, when the tail flash T is very thick, the first cam actuator device 82 and the second cam actuator device 82' are engaged simultaneously near the meshing point of the trim tool 70 and the nest tool 50 to shear the tail flash T, as shown in FIG. 19.

Figure 18:
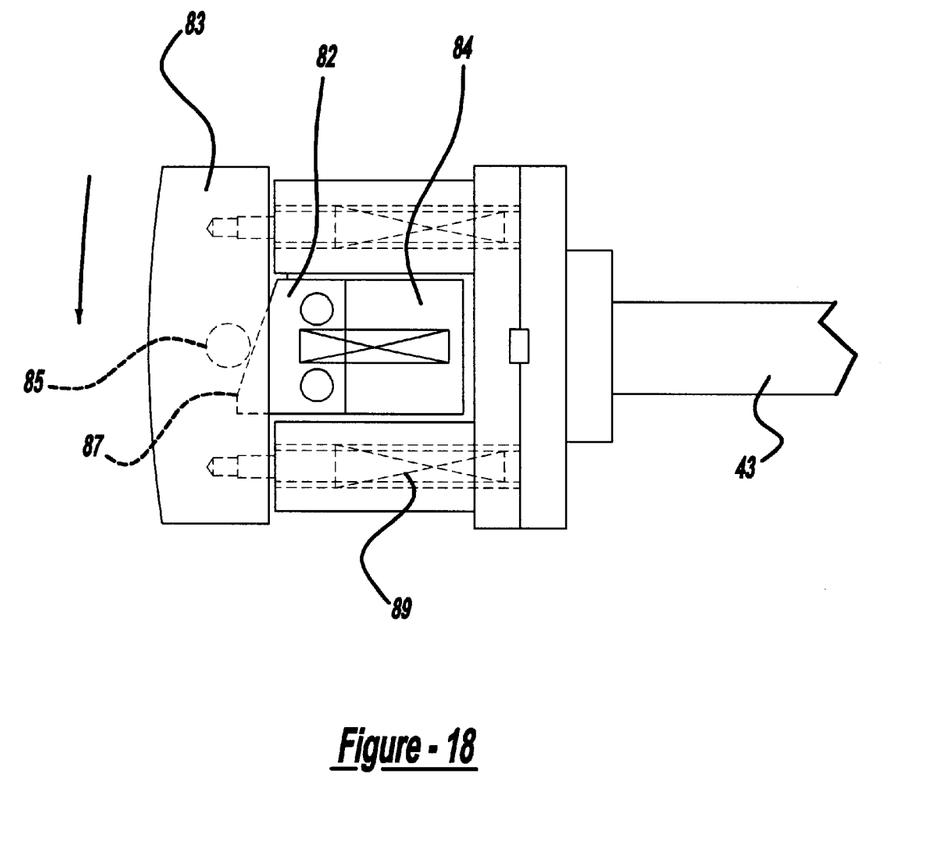
FIG. 18 is a top view of the tail flash trimmer.

As a further embodiment, the tail trimmer apparatus 80 may include one cam actuated trimmer 80, as described in connection with FIG. 18, and a second tail trimmer tool which is not cam actuated. Rather, the knife of the second tool may be fixed in position relative to the nest and trim tools and the first tail trimmer 80. As yet another embodiment, only a single, fixed position tail trimmer is used. In this alternative, the tail trimmer does not rotate with the nest and trim tools. Rather, a fixed position knife relies on the over travel of the tail flash, as it is rotated past the knife, to shear the tail flash from the container.

Figure 20:
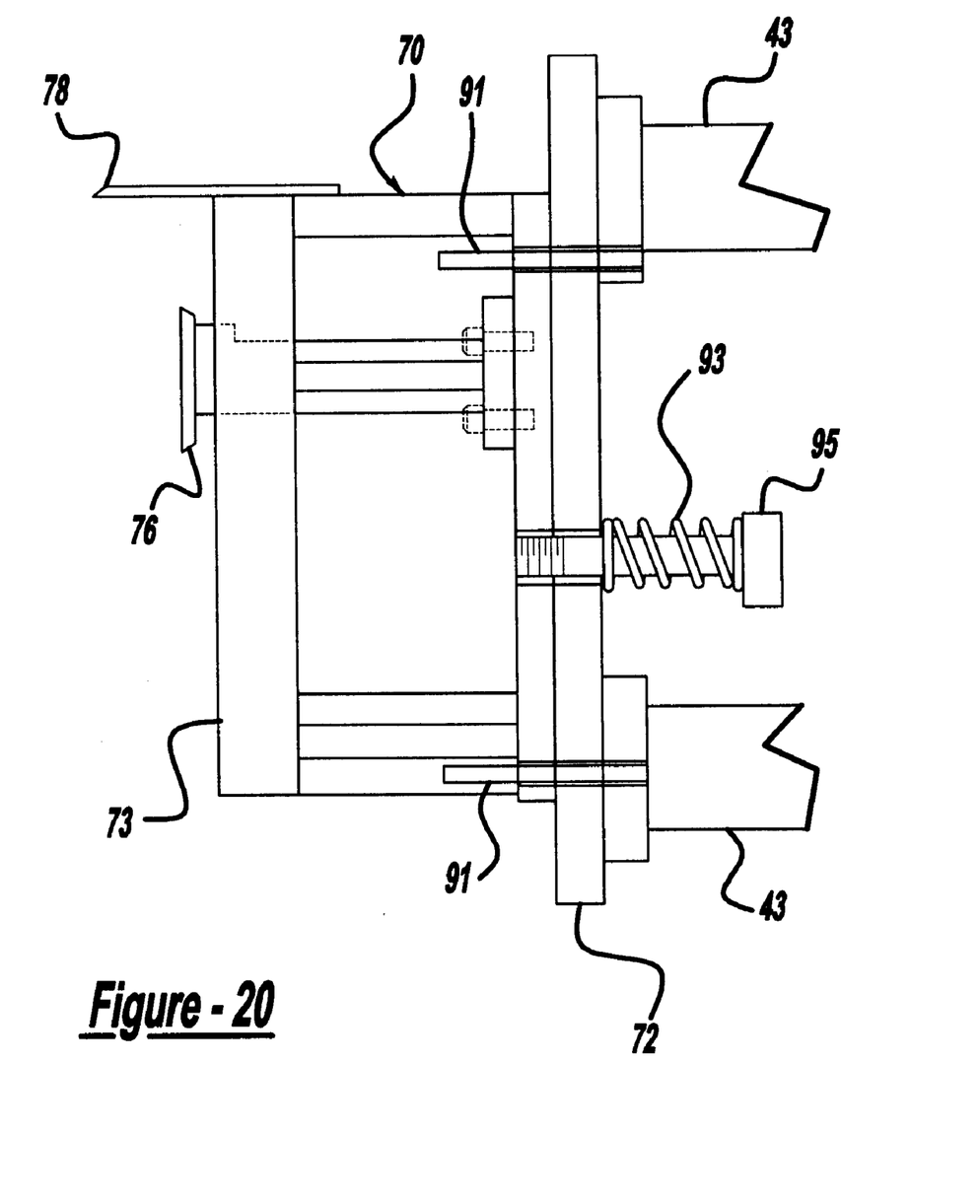
FIG. 20 is a side view of an embodiment of a trim tool construction for heavy flash.

Optionally, the entire trim tool 70 may be slidably supported on support pins 91 which extend radially from the vertical support surface 71, as shown in FIG. 20. The mounting plate 72 is then provided with close fit holes which permits it to slide on the support pins 91. The trim tool 70 is then also configured to operate in association with the cam 82 so that when follower 85 engages cam 82, the trim tool 70 slides outward along the support pins 91 to deflash the container A. This sliding movement of the trim tool 70 is especially advantageous since it adds radial shear force to the tangential shear force to further assist in deflashing a container A with heavy flash F. A spring 93 and pin 95 coupled to the trim tool 70 via the support plates 72 and mounting plate 71 return the tool 70 to a retracted position after engagement with the cam 82.

Referring back to FIG. 3, after the nest tool 50 and the trim tool 70 are rotated away from each other, the deflashed container A is removed from the nest tool 50 at an outfeeder 102. The outfeeder 102 is preferably one or more side rails 104 which strip the deflashed container A out of one of the tools 50, 70 and transfers the container A to a filling machine or a bottle accumulation station or a stacker device. The side rails 104 cooperate with a bottom rail 106 located at the same longitudinal plane as the nest tool 50 and trim tool 70 so that as the deflashed container A is released by either the nest tool or the trim tool, the container A is smoothly moved onto the bottom rail 106 for support of the deflashed container A. Alternatively, the deflashed container A is dropped downward into a basket (not shown) where the containers A are accumulated, for use at a later date or the deflashed container is moved onto an outfeeder conveyor device (not shown). Optionally, the container A can be held in either the nest tool 50 or trim tool 70 through a degree of rotation to permit the container A to be moved to a differently oriented outfeeder device 102.

As an alternative to the outfeeder 102 having side rails 104, an outfeeder can be provided in a manner similar to the infeeder's screws 12 as previously discussed. The outfeeder can therefore employ two outfeed screws or a single screw and rail combination. Additionally, the orientation of the outfeeder may be between 0° and 90° relative to the axis 40.

Notably, with infeeder 20 at an angle of 90 degrees to the longitudinal axis 40 of the trimmer 30, as shown in FIGS. 3 and 4, this facilitates the engagement of the container A with the nest tool 50 prior to the trim tool 70 meshing with the nest tool 50. The segmented nest tool 50 and it's associated recess 61 permits the body cavity 54 to sweep over the top of the inboard of the screws 12, and the bottom and tail body portion sweep below this screw 12. Alternatively, where the diameter of the screw 12 is greater than the gap between the body cavity 54 and the bottom and body portion, the inboard side guide rail 19 is provided adjacent to the shortened screw 12. The inboard rail thickness is less than the gap and permits the nest tool to rotate past it. The inboard rail 19 thus guides the container A along the longitudinal axis 18 as the second screw 22 advances the container A toward the trimmer 30, until picked up by the nest tool 50.

While the above preferred embodiment illustrates the invention, it is understood that this invention is capable of other modifications and therefore the invention is not limited to the precise detail set forth in the embodiments but falls within the changes and alterations that fall within the purview of the following claims.

What we claim is:

1. An apparatus for trimming flash from blow molded plastic articles, said apparatus comprising:
   a first rotatable member mounted for rotation about a first axis;
   a second rotatable member mounted for rotation about a second axis, said second axis being parallel to said first axis;
   drive means for causing synchronized rotation of said first and second rotatable members in opposing directions;
   a plurality of first tools mounted to said first rotatable member for rotation therewith, said first tools being equidistantly spaced around said first rotatable member, said first tools having surfaces to receive the article to be trimmed therein;
   a plurality of second tools mounted to said second member for rotation therewith, said second tools being equidistantly spaced around said second rotatable member, said second tools having edges corresponding to the article's shape where trimming of flash is to occur;

said first and second rotatable members positioned in relation to one another and synchronized in rotation such that said first and second tools intermesh with said edges trimming flash from the article received in said first tool, rotation of said first and second tools respectively defining effective diameters having a common, generally tangential axis defined therebetween where said first and second tools intermesh; and an infeed station providing the articles having flash to said first and second tools, said infeed station including at least one rotating screw member, said screw member having a thread defined therein to receive and maintain the articles in a predetermined orientation, rotation of said screw advancing the articles along said screw and providing the article to said first and second tools, said thread having a pitch varying along at least a portion of the length of the screw whereby spacing between adjacent articles is increased before the articles are provided to said first and second tools.

2. An apparatus as claimed in claim 1 wherein said infeed station further includes two screw members, respectively a first and second screw member.

3. An apparatus as claimed in claim 2 wherein said first and second screw members are in spaced relation to receive articles therebetween.

4. An apparatus as claimed in claim 2 wherein said first and second screw members are parallel to one another.

5. An apparatus as claimed in claim 2 wherein said first and second screw members define longitudinal screw axes, said screw axes defining an angle with said tangential axis in the range of about 0–90°.

6. An apparatus as claimed in claim 2 wherein said first and second screw members define longitudinal screw axes, said screw axes being non-parallel to said tangential axis.

7. An apparatus as claimed in claim 1 wherein said screw member defines a longitudinal screw axis defining an angle with said tangential axis in the range of about 0–90°.

8. An apparatus as claimed in claim 1 wherein said screw member defines a longitudinal axis which is non-parallel to said tangential axis.

9. An apparatus as claimed in claim 1 wherein said infeed station provides the articles first into engagement with one of said first tools.

10. An apparatus as claimed in claim 2 wherein one of said first and second screw members has a length greater than the other of said first and second screw members.

11. An apparatus as claimed in claim 10 wherein said one of said first and second screw members having a greater length is located radially farther away from said first and second rotatable members than said other of said first and second screw members.

12. An apparatus as claimed in claim 1 wherein said edges of said second tool include an edge for trimming flash on the article of at least one kind selected from the group of top flash, handle flash and tail flash.

13. An apparatus as claimed in claim 1 wherein said plurality of first tools includes at least three of said first tools and said plurality of said second tools includes at least three of said second tools.

14. An apparatus as claimed in claim 1 wherein said infeed station further includes a guide rail supporting the articles vertically while the articles are in engagement with said screw member.

15. An apparatus as claimed in claim 1 wherein said infeed station further includes a guide rail supporting the articles laterally while the articles are in engagement with said screw member.

16. An apparatus as claimed in claim 14 wherein said guide rail is curved along at least a portion of its length.

17. An apparatus as claimed in claim 15 wherein said guide rail is curved along at least a portion of its length.

18. An apparatus as claimed in claim 1 further including a tail trimmer assembly having a rotated portion rotated with said second tools, said rotated portion including a radially movable blade.

19. An apparatus as claimed in claim 18 wherein said tail trimmer assembly further includes a stationary portion which does not rotate with said second tool, said stationary portion engaging said rotated portion as said rotated portion is rotated therepast and causing said blade to be moved radially.

20. An apparatus as claimed in claim 19 wherein said stationary portion includes a cam having a cam surface and said blade is coupled to a follower member, said follower member engaging said cam surface during rotation and causing radially outward movement of said blade.

21. An apparatus as claimed in claim 19 wherein said radially outward movement of said blade occurs when said first and second tools are juxtaposed.

22. An apparatus as claimed in claim 1 wherein said second tool is radially moveable.

23. An apparatus as claimed in claim 22 wherein said second tool is biased by a biasing member into a radially retracted position.

24. An apparatus as claimed in claim 22 wherein said second tool includes a stationary portion which does not rotate with said second rotating member and which engages a rotated portion of said second tool when said rotated portion is rotated therepast causing said rotated portion to move radially outward.

25. An apparatus as claimed in claim 24 wherein said stationary portion includes a cam having a cam surface and said rotated portion is coupled to a follower member, said follower member engaging said cam surface during rotation and causing radially outward movement of said rotated portion.

26. An apparatus as claimed in claim 24 wherein said radially outward movement of said rotated portion occurs when said first and second tools are juxtaposed.

27. An apparatus as claimed in claim 1 wherein the article remains in said first tool after trimming and is subsequently removed therefrom.

28. An apparatus as claimed in claim 1 wherein the article remains in said second tool after trimming and is subsequently removed therefrom.

* * * * *